May 2, 1933. K. HÖFNER 1,906,600
METHOD OF JOINTING OIL FILLED CABLES WITH HOLLOW CONDUCTORS
Filed Sept. 5, 1931
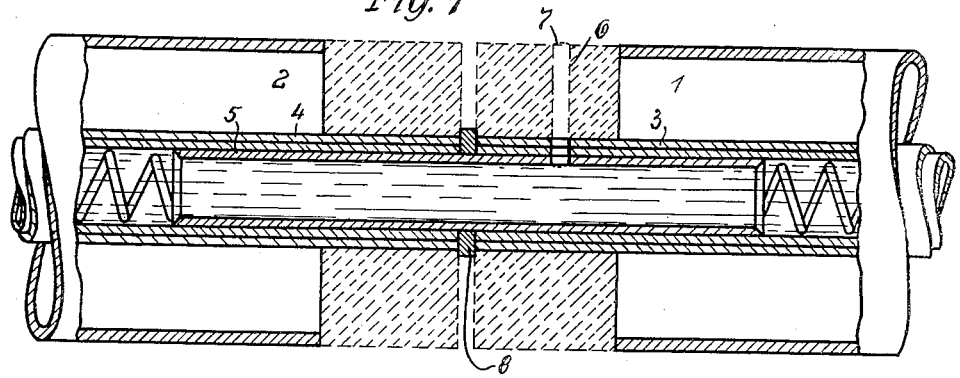
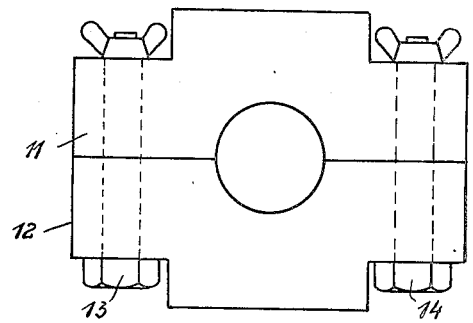
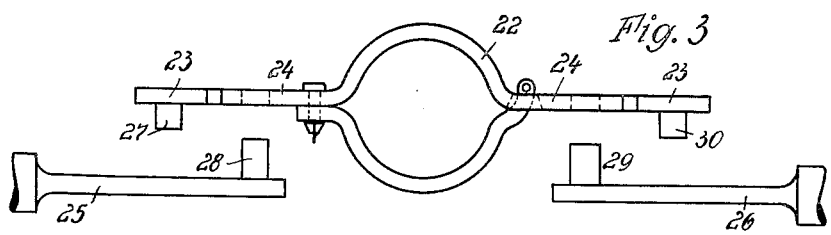
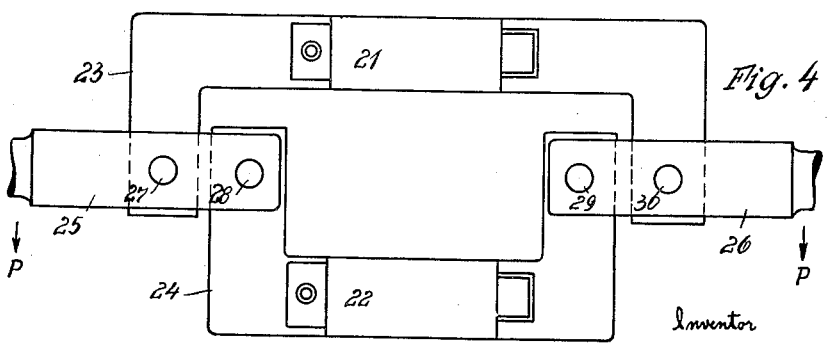
Inventor
Konrad Höfner Patented May 2, 1933

1,906,600

UNITED STATES PATENT OFFICE

KONRAD HÖFNER, OF BERLIN-CHARLOTTENBURG, GERMANY, ASSIGNOR TO SIEMENS-SCHUCKERTWERKE AKTIENGESELLSCHAFT, OF BERLIN-SIEMENSSTADT, GERMANY, A CORPORATION OF GERMANY

METHOD OF JOINTING OIL-FILLED CABLES WITH HOLLOW CONDUCTORS

Application filed September 5, 1931, Serial No. 561,489, and in Germany September 2, 1930.

My invention relates to an improved method of jointing oil-filled cables with hollow conductors.

In this type of electric cable the conductor forms, so to speak, a pipe in the cable, which contains an impregnating medium, for example oil, which always keeps the dielectric of the cable in a perfect impregnated condition, also when the cable is being transported and laid. The thermic expansion of the impregnating medium is balanced by special oil reservoirs joined to the cable ends. In these reservoirs devices are arranged which keep the oil in the cable under excess pressure. The cable is, therefore, filled with oil at the factory and shipped with closed cable ends. It is also laid in this condition. During the laying the cable ends must, however, be opened to make the joints. Consequently, unless convenient means are provided to join the hollow conductor ends quickly, a large quantity of oil flows out of the hollow conductor and the danger arises that not only large amounts of oil are discharged from the reservoir joined onto the other cable end but also from the cable, so that the impregnation of the dielectric of the cable is impaired.

My invention has as its object to eliminate undue waste of impregnation liquid, and loss of time in making the junction, by providing a new and improved method of making joints in oil-filled cables, through which the oil can continue to flow, after the joint is completed.

The method according to my invention will in the following be described with reference to the example given in the accompanying drawing, in which Fig. 1 shows in longitudinal section a joint made according to the method of my invention in an oil-filled electric cable, and Figs. 2, 3 and 4 show auxiliary devices serving to carry out the method according to my invention.

To carry out my invention, the cable ends 1 and 2 to be jointed (Fig. 1), and which are each closed with an oil-tight cap, are first placed against each other. Then the protecting cap is taken off, for example, at the cable end 1. The flow of oil taking place is limited by introducing a bush 5 so far into the opening of the hollow conductor 3 that about half of the bush still protrudes, and closing the opening at the free end of same by means of a tight plug. The outer diameter of the bush may be made equal to the inner diameter of the hollow conductor, its length depending upon the oil pressure. If the oil pressure in the cable is high, it is of advantage to choose the outer diameter of the bush 5, so as to obtain a tight fit in the hollow conductor 3, in order that the oil pressure may not be able to drive the bush 5 out. Should it not be possible, when driving in the bush, to push the supporting spiral of the hollow conductor far enough back, a sufficient length of the supporting spiral should be drawn out of the hollow conductor and cut off. After closing the bush 5 by means of a plug, it is temporarily secured against shifting in the hollow conductor by drilling a hole, say at 6, transversely near the end of the cable, including the lead sheath, the insulating layers round the conductor, the hollow conductor itself and the wall of the bush. Into this drilled hole a pin 7 is then driven. Then the ring 8 consisting of soldering or brazing material is placed on the bush 5, and now the protecting cap is taken off the cable end 2, and after the plug closing the opening of the bush 5 has been removed, the free end of the bush is introduced into the hollow conductor 4 of cable end 2. The two cable ends are, therefore, connected to one another by means of the bush 5 permitting free flow of oil from one cable section to the other. The joint is then prepared for brazing, or hard soldering, by cutting back the lead sheath and the conductor-insulating layers a certain length, shown by the dotted hatched area in Fig. 1. In order to prevent the conductor ends from unraveling, the individual strands of the hollow conductor are at the same time gripped by means of transverse clamps 11, 12 made of fire resisting material, and which are screwed together tightly by means of the bolts 13 and 14, as illustrated, for example, in Fig. 2. These clamps also protect the conductor insulation from being burnt during the brazing. A tool or device for pressing together the cable ends, for example as shown in Figs. 3 and 4, is then placed on the sheath of the two cable ends. This pressing device consists of the two shackles 21 and 22 each of which is tightly clamped to one of the two cable ends. The straps are fixed to yokes 23 and 24 respectively which, as shown in Figs. 3 and 4, are linked to the levers 25 and 26 by means of the pivots 27, 28 and 29, 30. By pulling the levers 25 and 26 in the direction of the arrows P—P, the straps 21 and 22, and therewith the cable cores clamped in same, are drawn towards each other.

After these preparations the conductor joint is brazed with suitable welding apparatus known in the art, an annular blow pipe nozzle being used for this purpose. Owing to the annular shape of the blow pipe nozzle, the part to be brazed is simultaneously uniformly heated around the entire conductor circumference, so that it is impossible for individual places or wires to be overheated. When the brazing material begins to melt, the cable ends are pressed tightly against each other by means of the pressing device shown in Fig. 3.

When the brazing is finished, the soldered joint is smoothed with a file or other suitable tools. The pin 7 is then removed, and the original conductor insulation is restored by winding insulating tapes round the smoothed soldered joint. On this material further layers of insulating tapes, for example impregnated paper tapes or varnished tapes are applied. Over the whole, the joint box is placed in the known manner, and the ends of same are soldered to the ends of the lead sheaths.

Alterations in the order of succession of the described manipulations are quite possible and the scope of my invention also extends to such alterations.

I claim as my invention:

1. The method of making a through-flow joint in tubular conductor oil-filled cables, comprising the steps of inserting liquid tight a tubular bushing, closed at its outer end, partway into the end of one cable conductor, temporarily securing said bushing in the cable end, placing a ring of brazing metal onto said bushing close to the conductor end, opening the closed bushing and inserting the protruding bushing end into the opened end of the other cable conductor, drawing the two cable ends tightly together with said brazing metal between them, flowing said brazing metal to solder said two ends and said bushing together, removing said temporary securing means, and insulating the soldered cable ends.

2. The method of making a through-flow joint in insulated stranded tubular oil-filled cables, comprising the steps of inserting liquid tight a tubular bushing, closed at its outer end, partway into the end of one tubular cable conductor, temporarily securing said bushing in the cable end, placing a ring of brazing metal onto said bushing close to the conductor end, opening the closed bushing and inserting the protruding bushing end into the opened end of the other cable conductor, baring each tubular conductor end of its insulation and clamping each bared conductor end to prevent unraveling of its strands, drawing the two conductor ends tightly together against said brazing metal, heating said metal uniformly on its circumference to solder the two conductor ends and said bushing together, removing said temporary bushing securing means and the end clamps, and replacing the insulation onto the conductor ends.

In testimony whereof I affix my signature.

KONRAD HÖFNER.